(12) United States Patent
Ishikawa et al.

(10) Patent No.: US 6,574,056 B2
(45) Date of Patent: Jun. 3, 2003

(54) EYE CUP MOVING MECHANISM OF OPTICAL DEVICE

(75) Inventors: Yasuaki Ishikawa, Setagaya (JP); Hiroharu Sakoda, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/875,909

(22) Filed: Jun. 8, 2001

(65) Prior Publication Data

US 2001/0055163 A1 Dec. 27, 2001

(30) Foreign Application Priority Data

Jun. 12, 2000 (JP) .......................................... 2000-175186

(51) Int. Cl.7 .................................................. G02B 7/02

(52) U.S. Cl. ...................... 359/823; 359/822; 359/425; 359/821; 359/819

(58) Field of Search ......................... 359/399, 406–411, 359/414, 416–418, 425, 823, 822

(56) References Cited

U.S. PATENT DOCUMENTS

| 5,610,761 A | * | 3/1997 | Ishibashi et al. ............ 359/407 |
| 5,784,207 A |   | 7/1998 | Satoh ......................... 359/700 |
| 6,014,253 A | * | 1/2000 | Funatsu ....................... 359/418 |
| 6,412,958 B2 | * | 7/2002 | Aikawa ....................... 359/600 |

* cited by examiner

*Primary Examiner*—Jordan M. Schwartz
*Assistant Examiner*—Jessica Stultz
(74) *Attorney, Agent, or Firm*—Oliff & Berridge, PLC

(57) ABSTRACT

An eye cup moving mechanism of an optical device includes: an eyepiece lens holding barrel that houses and holds an eyepiece lens; an eyepiece outer casing that is capable of sliding against an external circumferential portion of the eyepiece lens holding barrel; and an eye cup cover provided at the eyepiece outer casing. The eyepiece lens holding barrel includes a first regulating member provided at the external circumferential portion thereof; and the eyepiece outer casing includes a second regulating member that comes in contact with the first regulating member to regulate a movement of the eye cup cover along an optical axis of the eyepiece lens.

14 Claims, 6 Drawing Sheets

USER ↑

↓ OBJECTIVE LENS

EYE CUP MOVING MECHANISM OF OPTICAL DEVICE

INCORPORATION BY REFERENCE

The disclosure of the following priority application is herein incorporated by reference:
Japanese Patent Application No. 2000-175186 filed Jun. 12, 2000

BACKGROUND OF THE INVENTION

1. Field of the Invention

The present invention relates to an eye cup moving mechanism of an optical device having an eye cup, such as a telescope, a binocular or a microscope.

2. Description of the Related Art

The eye cup of an optical device, which is mounted at the eyepiece unit, is moved along the direction of the optical axis of the eyepiece lens to offer a comfortable visual field to both a user wearing glasses and a user who does not wear glasses. An eye cup in the prior art is rotated around the optical axis of the eyepiece lens to travel along the direction of the optical axis, and its traveling distance is regulated by a cam mechanism.

FIG. 5 is a longitudinal sectional view of the structure adopted in an eye cup moving mechanism in the prior art. An eye cup 20 is constituted by securing an eye cup cover 11 around the external circumference of an eyepiece outer casing 12. The eyepiece outer casing 12 is formed in a cylindrical shape, and its internal circumferential surface is allowed to slide against the external circumferential surface of an eyepiece lens holding barrel 14. The external circumferential surface "s" of the eyepiece lens holding barrel 14 is formed to extend straight along the direction of the optical axis. With the eyepiece outer casing 12 moving relative to the eyepiece lens holding barrel 14 along the external circumferential surface "s", the distance between an eye cup front end 20a and the outer end surface of the eyepiece lens is varied.

In FIG. 5, the eye cup front end 20a is at position d1 which sets the eye cup in an driven-out state. When the eye cup front end 20a is at position d2 indicated by the dotted line in the figure, the eye cup is in a driven-in state. The eye cup front end is set at position d1 or d2 by employing a cam mechanism constituted of camshafts 15a and 15b provided at the eyepiece lens holding barrel 14 and a cam groove (not shown) formed at the eyepiece outer casing 12. It is to be noted that the eyepiece lens holding barrel 14 normally holds a plurality of eyepiece lenses and is mounted at the optical device main unit on the objective lens side.

FIG. 6A is a top view, FIG. 6B is a side elevation, FIG. 6C is a bottom view and FIG. 6D is a side elevation of the half cylinder obtained by slicing the top view in FIG. 6A through line X—X, all provided to illustrate the structure of the eyepiece outer casing 12 in the prior art.

Simply put, the eyepiece outer casing 12 is a cylinder having two cam grooves 16a and 16b set at 180° relative to each other at the cylinder surface. The camshafts 15a and 15b in FIG. 5 engage with the two cam grooves 16a and 16b respectively. When the camshafts 15a and 15b are each at position d1, the eye cup 20 is set in a driven-out state, whereas when the camshafts 15a and 15b are at position d2, the eye cup 20 is set in a driven-in state. When the eye cup 20 is retained at either position d1 or d2, the camshafts 15a and 15b are each pressed at an end of the cam groove 16a or 16b. In other words, the movement of the eye cup is regulated by the cam mechanism.

When the camshafts are retained to set the position of the eye cup, the camshafts are pressed against the cam grooves, and thus, the greatest force is applied where the camshafts are mounted at the eyepiece holding barrel. In an optical device having a compact eyepiece unit, in particular, small camshafts that are mounted (e.g., screwed in) over a small screwing diameter are naturally used.

The eye cup cover for the eye cup is often constituted of rubber, and when it is rotated, a large moment is generated to result in an impact force manifesting upon the camshafts becoming pressed against the ends (position d1 or d2) of the cam grooves. In a worst case, the areas over which camshafts are mounted that are most greatly affected by the impact force may become damaged. The ends of the cam grooves, too, are subject to the impact force.

SUMMARY OF THE INVENTION

An object of the present invention is to provide an eye cup moving mechanism that prevents camshafts and cam grooves from becoming damaged even when a great force is applied.

In order to attain the above object, an eye cup moving mechanism of an optical device according to the present invention, comprises: an eyepiece lens holding barrel that houses and holds an eyepiece lens; an eyepiece outer casing that is capable of sliding against an external circumferential portion of the eyepiece lens holding barrel; and an eye cup cover provided at the eyepiece outer casing. The eyepiece lens holding barrel includes a first regulating member provided at the external circumferential portion thereof; and the eyepiece outer casing includes a second regulating member that comes in contact with the first regulating member to regulate a movement of the eye cup cover along an optical axis of the eyepiece lens.

In this eye cup moving mechanism of an optical device, it is preferred that the eyepiece lens holding barrel and the eyepiece outer casing are relatively moved along an optical axis of the eyepiece lens by a cam mechanism constituted of a cam shaft provided at either the eyepiece lens holding barrel or the eyepiece outer casing and a cam groove formed at either the eyepiece lens holding barrel or the eyepiece outer casing at which the camshaft is not provided; and the first regulating member at the eyepiece lens holding barrel and the second regulating member at the eyepiece outer casing are provided so as to come into contact with each other before an end of the cam groove comes in contact with the camshaft.

Also, it is preferred that the first regulating member comprises a third regulating member and a fourth regulating member; the second regulating member comprises a fifth regulating member and a sixth regulating member; the third regulating member at the eyepiece lens holding barrel and the fifth regulating member at the eyepiece outer casing come in contact with each other when the eye cup cover is driven-out furthest toward a user; and the fourth regulating member at the eyepiece lens holding barrel and the sixth regulating member at the eyepiece outer casing come in contact with each other when the eye cup cover is driven in furthest from the user. In this case, it is preferred that the third regulating member and fourth regulating member are formed so as to project outward at the external circumferential portion of the eyepiece lens holding barrel; the fifth regulating member is formed so as to project inward at an internal circumferential portion of the eyepiece outer casing;

and the sixth regulating member is constituted of an end of the eyepiece outer casing located on a side opposite from the user. Furthermore, it is preferred that a cutting portion is provided at a portion of at least either the third regulating member or the fifth regulating member so as to ensure that the third regulating member and the fifth regulating member do not come in contact with each other.

Also, it is preferred that the first regulating member at the eyepiece lens holding barrel and the second regulating member at the eyepiece outer casing come in contact with each other when the eye cup cover is driven-out furthest toward a user. In this case, it is preferred that the first regulating member is formed so as to project outward at the external circumferential portion of the eyepiece lens holding barrel; and the second regulating member is formed so as to project inward at an internal circumferential portion of the eyepiece outer casing. Furthermore, it is preferred that a cutting portion is provided at a portion of at least either the first regulating member or the second regulating member so as to ensure that the first regulating member and the second regulating member do not come in contact with each other.

Also, it is preferred that the first regulating member at the eyepiece lens holding barrel and the second regulating member at the eyepiece outer casing come in contact with each other when the eye cup cover is driven in furthest from a user. In this case, it is preferred that the first regulating member is formed so as to project outward at the external circumferential portion of the eyepiece lens holding barrel; and the second regulating member is constituted of an end of the eyepiece outer casing located on a side opposite from the user.

A telescope according to the present invention comprises at least one eye cup moving mechanism. The eye cup moving mechanism comprises: an eyepiece lens holding barrel that houses and holds an eyepiece lens; an eyepiece outer casing that is capable of sliding against an external circumferential portion of the eyepiece lens holding barrel; and an eye cup cover provided at the eyepiece outer casing. The eyepiece lens holding barrel includes a first regulating member provided at the external circumferential portion thereof; and the eyepiece outer casing includes a second regulating member that comes in contact with the first regulating member to regulate a movement of the eye cup cover along an optical axis of the eyepiece lens.

DESCRIPTION OF THE PREFERRED EMBODIMENT

The eye cup moving mechanism according to the present invention includes an eyepiece lens holding barrel 4, an eye cup 10 constituted by securing an eye cup cover 1 around the external circumference of an eyepiece outer casing 2 and a mechanism that allows the eyepiece outer casing 2 to slide against the eyepiece lens holding barrel 4. This eye cup moving mechanism features a mechanism that prevents damage to the camshafts and the cam grooves by providing an additional regulating member without stopping movement with a cam mechanism.

The following is an explanation of the eye cup moving mechanism according to the present invention, given in reference to the drawings.

Figure 1:
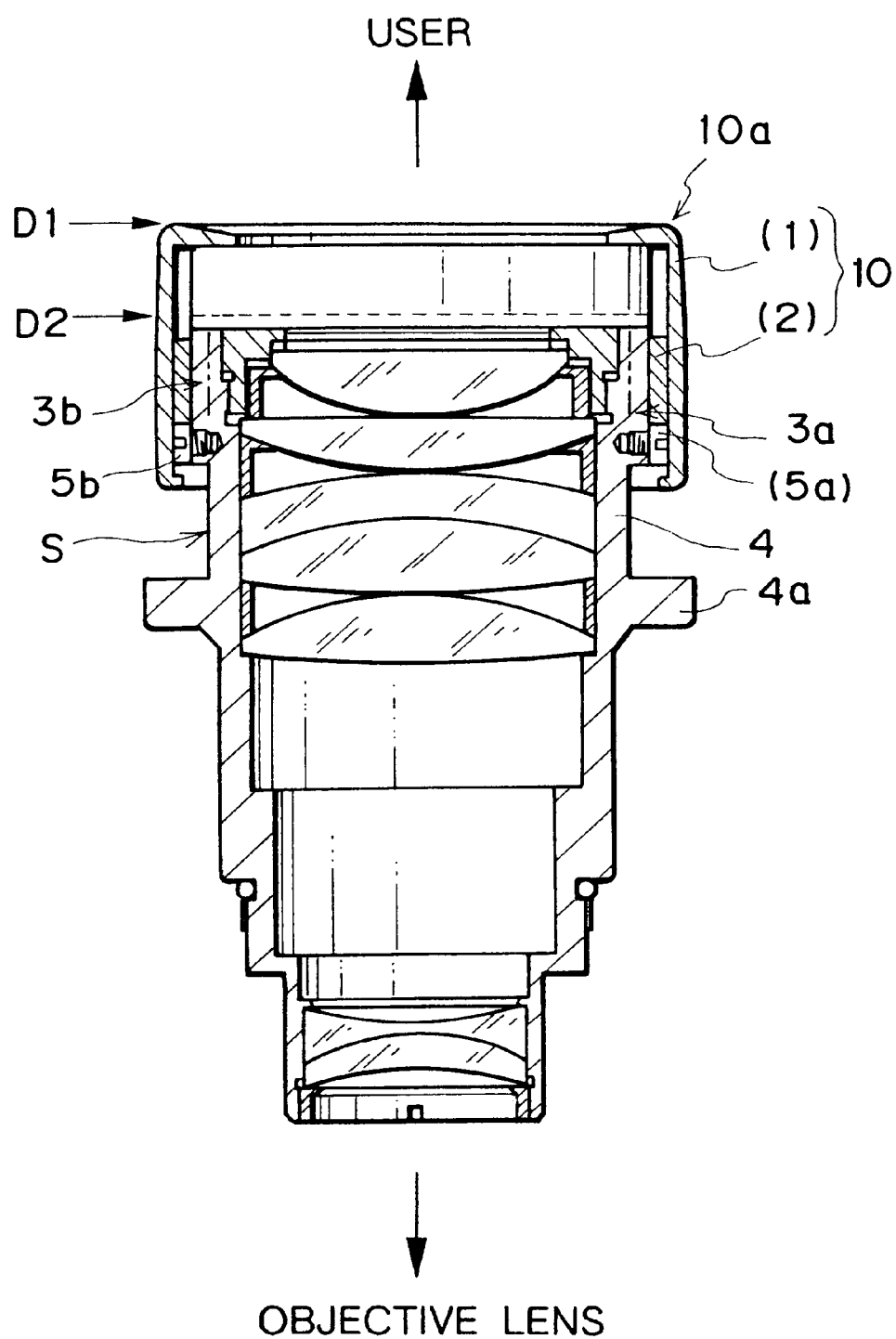
FIG. 1 is a longitudinal sectional view illustrating the structure adopted in the eye cup moving mechanism in conjunction with the eyepiece unit in an embodiment of the present invention.
Figure 2A:
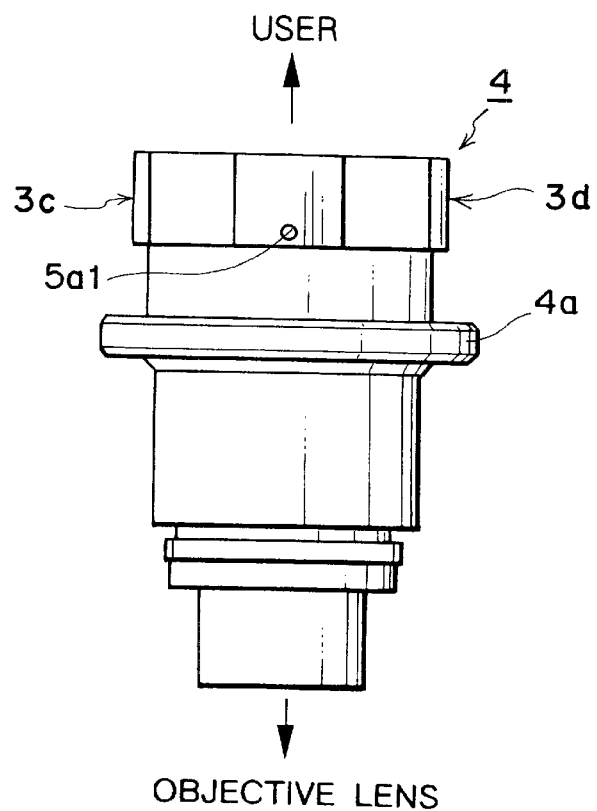
FIG. 2A is a side elevation of the eyepiece lens holding barrel adopted in conjunction with the eye cup moving mechanism in the embodiment of the present invention.
Figure 2B:
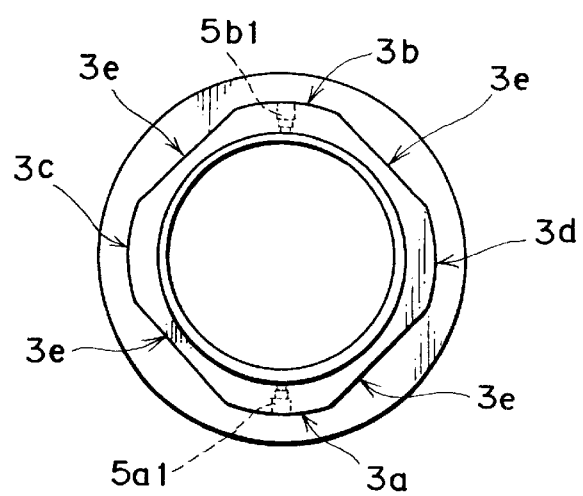
FIG. 2B is a top view of the eyepiece lens holding barrel.
Figure 3A:
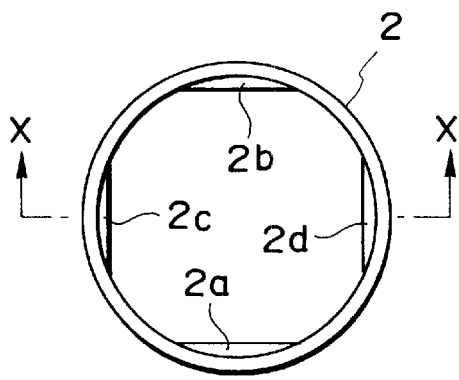
FIGS. 3A~3C are a top view, a side elevation and a bottom view, provided to illustrate the structure of the eyepiece outer casing adopted in conjunction with the eye cup moving mechanism in the embodiment of the present invention.
Figure 3D:
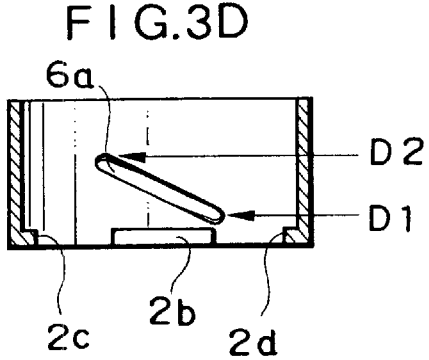
FIG. 3D is a side elevation of the half cylinder obtained by slicing FIG. 3A through line X—X.
Figure 3B:
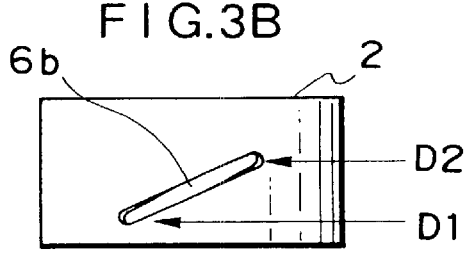
Figure 3C:
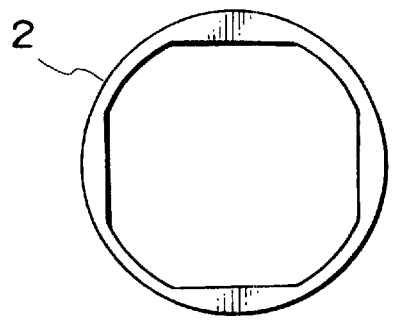
Figure 4:
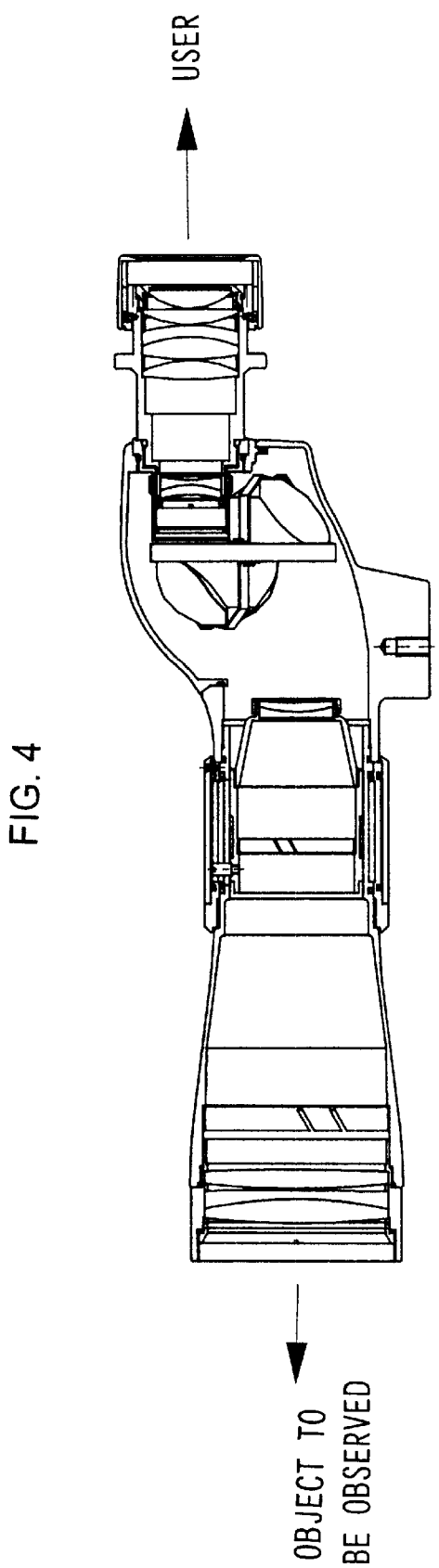
FIG. 4 is an overall view of a telescope having the eye cup moving mechanism according to the present invention.
Figure 5:
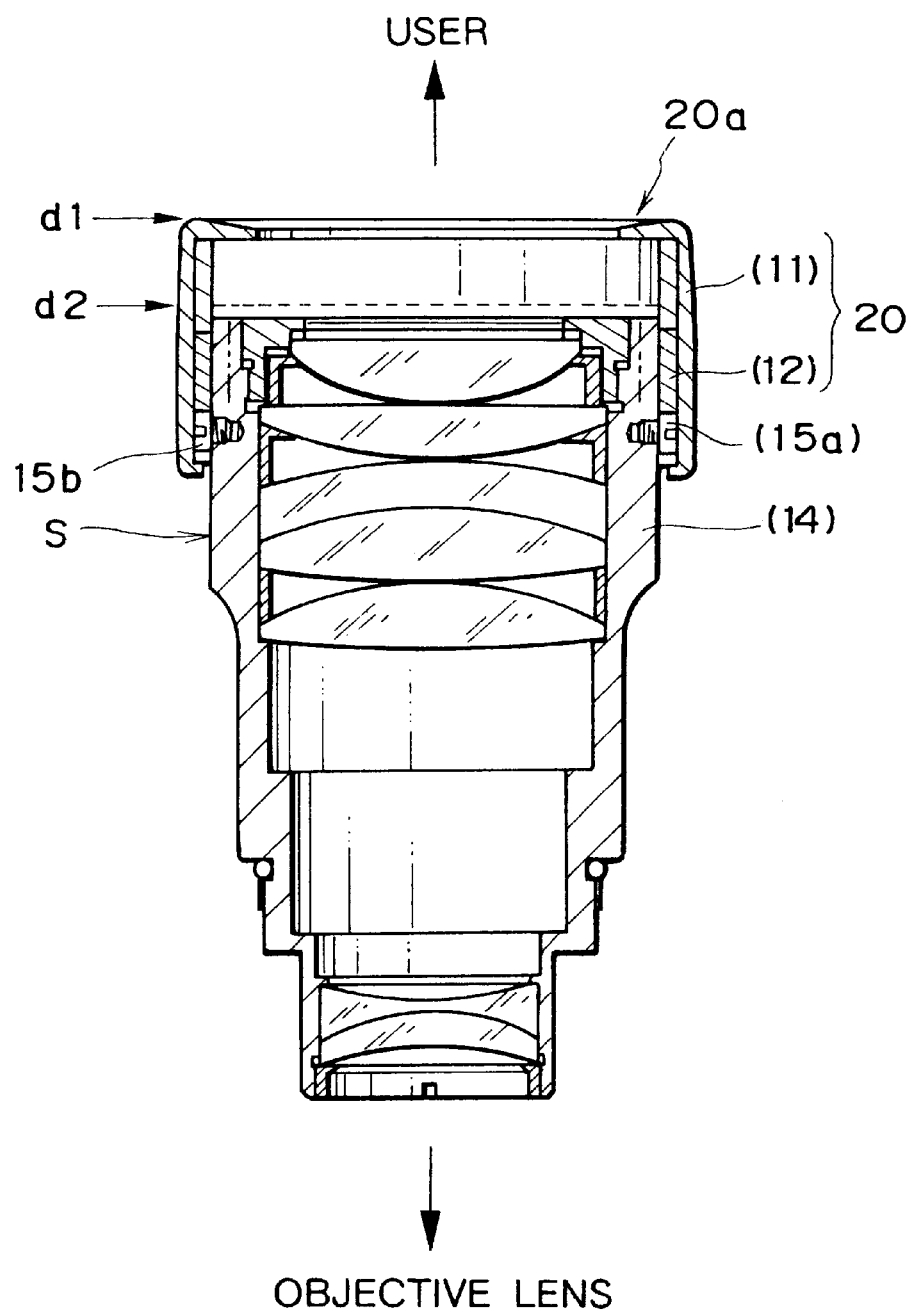
FIG. 5 is a longitudinal sectional view of the structure adopted in an eye cup moving mechanism in the prior art in conjunction with a specific eyepiece unit.
Figure 6A:
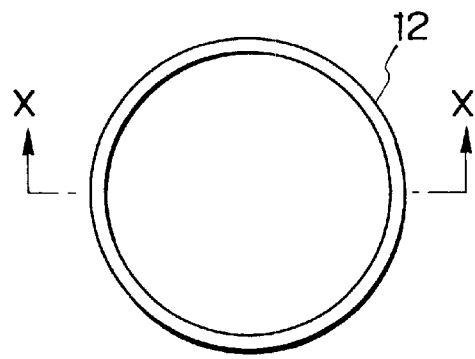
FIGS. 6A~6C are a top view, a side elevation and the bottom view, provided to illustrate the structure of the eyepiece outer casing adopted in conjunction with the eye cup moving mechanism in the prior art.
Figure 6D:
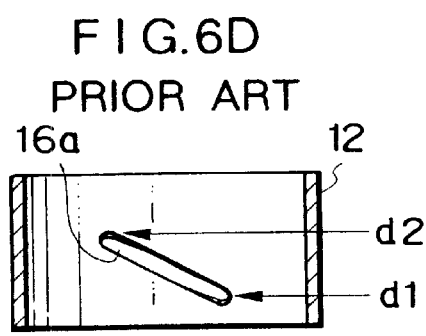
FIG. 6D is a side elevation of the half cylinder obtained by slicing the top view in FIG. 6A through line X—X.
Figure 6B:
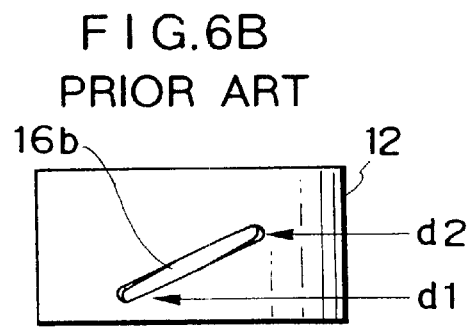
Figure 6C:
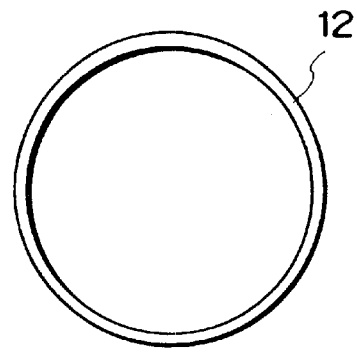

FIG. 4 is an overall view of a telescope provided with the eye cup moving mechanism according to the present invention. FIG. 1 is a longitudinal sectional view illustrating the eye cup moving mechanism adopted in the telescope in FIG. 4 in conjunction with the eyepiece unit. FIG. 2A is a side elevation and FIG. 2B is a top view, both showing a state in which the eye cup in the longitudinal sectional view in FIG. 1 is removed. FIG. 3A is a top view, FIG. 3B is a side elevation, FIG. 3C is a bottom view and FIG. 3D is a side elevation of the half cylinder obtained by slicing the top view in FIG. 3A through line X—X, all provided to illustrate the structure of the eyepiece outer casing adopted in the eye cup moving mechanism in the embodiments of the present invention. The X—X sectional plane passes through the center of the eyepiece outer casing. It is to be noted that in the explanation given in reference to FIGS. 1 through 3, members and mechanisms that are identical to those employed in the prior art explained in reference to FIGS. 5~6D earlier may not be explained again. In FIG. 1, the eye cup 10 is in a driven-out state when the eye cup front end 10a is at position D1, whereas the eye cup 10 is in a driven-in state when the eye cup front end 10 a is at position D2 indicated by the dotted line in the figure. The interval between D1 and D2 represents the distance over which the eye cup 10 travels.

The following two features differentiate the eye cup moving mechanism according to the present invention from those in the prior art. Firstly, the eye cup moving mechanism according to the present invention includes a ring-like (toroidal, brim shaped or flange shaped) projecting portion 4a which extends out around the circumference of the eyepiece lens holding barrel 4, located near the center of the eyepiece lens holding barrel 4. Secondly, the eye cup moving mechanism according to the present invention includes a similar ring-like projecting portion 3 (3a and 3b in the figure) extending around the circumference of the eyepiece lens holding barrel 4, located toward the observer (toward the user) at the eyepiece lens holding barrel 4. Thus, a structure having stages at the external circumferential surface S of the eyepiece lens holding barrel 4 is achieved. These features are easily discerned when one compares the longitudinal sectional view in FIG. 1 with the longitudinal sectional view in FIG. 5.

FIG. 2A is a side elevation and FIG. 2B is a top view of the eyepiece lens holding barrel 4 employed in the eye cup moving mechanism according to the present invention. It is to be noted that FIGS. 2A and 2B show the eyepiece lens holding barrel 4 rotated by 90° around the optical axis of the eyepiece lens relative to FIG. 1. FIGS. 2A and 2B even more clearly show the two features described above, i.e., the projecting portion 4a and the projecting portion 3 (constituted of 3a~3d). The projecting portion 4a and the projecting portion 3 together achieve a function as a regulating member. In addition, screw holes 5a1 and 5b1 at which camshafts 5a and 5b are to be mounted are formed at projecting portions 3a and 3b.

The projecting portion 3 is formed in a circular shape having 4 cutting portions 3e, as is clearly shown in the top view in FIG. 2B. The reason for providing such cutting portions at the projecting portion 3 is to be explained later. It is to be noted that the eyepiece lens holding barrel 4, which must achieve a high degree of both dimensional accuracy and strength, is normally an integrated unit constituted of metal.

FIGS. 3A~3D show the structure of the eyepiece outer casing employed in the eye cup moving mechanism according to the present invention. The side elevation presented in FIG. 3D is a side elevation of the half cylinder obtained by slicing the top view in FIG. 3A through line X—X. As becomes obvious when FIGS. 3A and 3D are compared with FIGS. 6A and 6D respectively, the eyepiece outer casing 2 is characterized in that four distended (or projected) portions 2a~2d are provided on the lower side of its inner surface (toward the objective lens). These distended portions provide a function as a regulating member provided at the eyepiece outer casing.

Now, the reason for providing the cutting portions at the projecting portion 3 is explained, in reference to FIGS. 2B and 3A. The eye cup is mounted at the eyepiece unit by inserting the eyepiece outer casing 2 at the eyepiece lens holding barrel 4. This process is facilitated by aligning the distended portions 2a~2d at the eyepiece outer casing 2 with the positions of the cutting portions 3e. Then, by turning the eyepiece outer casing 2 by 45°, the alignment of the projecting portions 3a~3b with the distended portions 2a~2d is completed.

Next, the specific manner in which the eye cup moving mechanism according to the present invention operates is explained.

Two cam grooves 6a and 6b are set at 180° relative to each other at the cylinder surface of the eyepiece outer casing 2 (see FIGS. 3B and 3D). The camshafts 5A and 5B shown in FIG. 1 are respectively engaged with these cam grooves, so that the eye cup is set in a driven-out state when the camshafts 5a and 5b are each at position D1 and the eye cup is set in a driven-in state when the camshafts 5A and 5B are each at position D2. The system explained so far is identical to that in the mechanism in the prior art.

As described earlier in reference to FIG. 5, the camshafts 15a and 15b are respectively pressed against the ends of the cam grooves 16a and 16b when the eye cup is retained at position d1 or d2 by utilizing the eye cup moving mechanism in the prior art. However, this does not happen in the eye cup moving mechanism according to the present invention.

In the eye cup moving mechanism according to the present invention, at least one regulating member is provided both at the eyepiece lens holding barrel 4 and the eyepiece outer casing 2. In the embodiment, two regulating members, i.e., the regulating member 4a and the regulating member 3 (which is constituted of 3a~3d) are provided at the eyepiece lens holding barrel 4, as shown in FIGS. 1 and 2. In addition, the regulating members 2a~2d are provided at the eyepiece outer casing 2, as shown in FIG. 3.

As the eye cup 10 is driven-out to reach position D1, regulating members 2a~2d at the eyepiece outer casing 2 are placed in contact with the regulating member 3 (3a~3d) of the eyepiece lens holding barrel 4, thereby stopping the eye cup 10. If, on the other hand, the eye cup 10 is driven in to reach position D2, the end surface of the eyepiece outer casing 2 toward the objective lens is placed in contact with the regulating member 4a of the eyepiece lens holding barrel 4, thereby stopping the eye cup 10. The eyepiece outer casing 2 stop positions (D1 and D2) are set slightly inward relative to the positions at which the camshafts 5a and 5b would come in contact with the ends of the cam grooves 6a and 6b respectively, to ensure that the camshafts 5a and 5b are never pressed against the ends of the cam grooves 6a and 6b. As a result, damage to the camshafts and cam grooves is prevented.

In addition, since the regulating members are formed at the existing eyepiece lens holding barrel and eyepiece outer casing, the number of components required to constitute the eye cup moving mechanism does not need to increase compared to that in the prior art.

While the eye cup moving mechanism in the embodiment is explained above by using an example in which it is adopted in a telescope, the present invention is not limited to this example, and it may be adopted in all types of optical devices having an eye cup moving mechanism including binoculars, microscopes and the like.

What is claimed is:

1. An eye cup moving mechanism of an optical device, comprising:
    an eyepiece lens holding barrel that houses and holds an eyepiece lens;
    an eyepiece outer casing that is capable of sliding against an external circumferential portion of said eyepiece lens holding barrel; and
    an eye cup cover provided at said eyepiece outer casing, wherein:
        said eyepiece lens holding barrel includes a first regulating member that has a ring-like shape and is provided around the external circumferential portion thereof and
        said eyepiece outer casing includes a second regulating member that comes in contact with said first regulating member to regulate a movement of said eye cup cover along an optical axis of said eyepiece lens.

2. An eye cup moving mechanism of an optical device according to claim 1, wherein:
    said eyepiece lens holding barrel and said eyepiece outer casing are relatively moved along an optical axis of said eyepiece lens by a cam mechanism constituted of a cam shaft provided at either said eyepiece lens holding barrel or said eyepiece outer casing and a cam groove formed at either said eyepiece lens holding barrel or said eyepiece outer casing at which said camshaft is not provided; and
    said first regulating member at said eyepiece lens holding barrel and said second regulating member at said eyepiece outer casing are provided so as to come into contact with each other before an end of said cam groove comes in contact with said camshaft.

3. An eye cup moving mechanism of an optical device, comprising:
    an eyepiece lens holding barrel that houses and holds an eyepiece lens;

an eyepiece outer casing that is capable of sliding against an external circumferential portion of said eyepiece lens holding barrel; and an eye cup cover provided at said eyepiece outer casing, wherein:

said eyepiece lens holding barrel includes a first regulating member and a second regulating member;

said eyepiece outer casing includes a third regulating member and a fourth regulating member that respectively come in contact with said first regulating member and said second regulating member to regulate a movement of said eye cup cover along an optical axis of said eyepiece lens:

said first regulating member at said eyepiece lens holding barrel and said third regulating member at said eyepiece outer casing come in contact with each other when said eye cup cover is driven-out furthest toward a user; and said second regulating member at said eyepiece lens holding barrel and said fourth regulating member at said eyepiece outer casing come in contact with each other when said eye cup cover is driven in furthest from the user.

4. An eye cup moving mechanism of an optical device according to claim 3, wherein:

said first regulating member and said second regulating member are formed so as to project outward at the external circumferential portion of said eyepiece lens holding barrel; and said third regulating member is formed so as to project inward at an internal circumferential portion of said eyepiece outer casing.

5. An eye cup moving mechanism of an optical device according to claim 1, wherein:

said first regulating member at said eyepiece lens holding barrel and said second regulating member at said eyepiece outer casing come in contact with each other when said eye cup cover is driven-out furthest toward a user.

6. An eye cup moving mechanism of an optical device according to claim 5, wherein:

said first regulating member is formed so as to project outward at the external circumferential portion of said eyepiece lens holding barrel; and said second regulating member is formed so as to project inward at an internal circumferential portion of said eyepiece outer casing.

7. An eye cup moving mechanism of an optical device according to claim 1, wherein:

said first regulating member at said eyepiece lens holding barrel and said second regulating member at said eyepiece outer casing come in contact with each other when said eye cup cover is driven in furthest from a user.

8. An eye cup moving mechanism of an optical device according to claim 7, wherein:

said first regulating member is formed so as to project outward at the external circumferential portion of said eyepiece lens holding barrel; and said second regulating member is constituted of an end of said eyepiece outer casing located on a side opposite from the user.

9. An eye cup moving mechanism of an optical device according to claim 4, wherein:

a cutting portion is provided at a portion of at least one of said first regulating member and said third regulating member so as to ensure that the portion of one of said first regulating member and said third regulating member do not come in contact with another one of said first regulating member and said third regulating member.

10. An eye cup moving mechanism of an optical device according to claim 6, wherein:

a cutting portion is provided at a portion of at least one of said first regulating member and said second regulating member so as to ensure that the portion of one of said first regulating member and said second regulating member do not come in contact with another one of said first regulating member and said second regulating member.

11. A telescope comprising at least one eye cup moving mechanism, said eye cup moving mechanism comprising:

an eyepiece lens holding barrel that houses and holds an eyepiece lens;

an eyepiece outer casing that is capable of sliding against an external circumferential portion of said eyepiece lens holding barrel; and an eye cup cover provided at said eyepiece outer casing, wherein:

said eyepiece lens holding barrel includes a first regulating member that has a ring-like shape and is provided around the external circumferential portion thereof; and said eyepiece outer casing includes a second regulating member that comes in contact with said first regulating member to regulate a movement of said eye cup cover along an optical axis of said eyepiece lens.

12. An eye cup moving mechanism of an optical device according to claim 3, wherein:

said eyepiece lens holding barrel and said eyepiece outer casing are relatively moved along an optical axis of said eyepiece lens by a cam mechanism constituted of a cam shaft provided at either said eyepiece lens holding barrel or said eyepiece outer casing and a cam groove formed at either said eyepiece lens holding barrel or said eyepiece outer casing at which said camshaft is not provided, said first regulating member at said eyepiece lens holding barrel and said third regulating member at said eyepiece outer casing are provided so as to come into contact with each other before an end of said cam groove comes in contact with said camshaft, and said second regulating member at said eyepiece lens holding barrel and said fourth regulating member at said eyepiece outer casing are provided so as to come into contact with each other before another end of said cam groove comes in contact with said camshaft.

13. An eye cup moving mechanism of an optical device according to claim 3, wherein said first regulating member and said second regulating member each has a ring-like shape and is provided around the external circumferential portion of said eyepiece lens holding barrel.

14. An eye cup moving mechanism of an optical device according to claim 4, wherein said fourth regulating member is constituted of an end of said eyepiece outer casing located on a side opposite from the user.

* * * * *